US009725561B2

(12) United States Patent
Rathore

(10) Patent No.: US 9,725,561 B2
(45) Date of Patent: Aug. 8, 2017

(54) CURABLE POLYMERS COMPRISING SILSESQUIOXANE POLYMER CORE AND SILSESQUIOXANE POLYMER OUTER LAYER AND METHODS

(71) Applicant: 3M INNOVATIVE PROPERTIES COMPANY, St. Paul, MN (US)

(72) Inventor: Jitendra S. Rathore, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 15/307,102

(22) PCT Filed: May 20, 2015

(86) PCT No.: PCT/US2015/031727
§ 371 (c)(1),
(2) Date: Oct. 27, 2016

(87) PCT Pub. No.: WO2015/195268
PCT Pub. Date: Dec. 23, 2015

(65) Prior Publication Data
US 2017/0101511 A1  Apr. 13, 2017

Related U.S. Application Data

(60) Provisional application No. 62/014,778, filed on Jun. 20, 2014.

(51) Int. Cl.
| *C08F 2/46* | (2006.01) |
| *C08F 2/50* | (2006.01) |
| *C08G 61/04* | (2006.01) |
| *C08G 77/20* | (2006.01) |
| *C09D 183/04* | (2006.01) |
| *C08G 77/04* | (2006.01) |
| *C09J 183/04* | (2006.01) |
| *C08G 77/12* | (2006.01) |

(52) U.S. Cl.
CPC ............ *C08G 77/20* (2013.01); *C08G 77/04* (2013.01); *C09D 183/04* (2013.01); *C09J 183/04* (2013.01); *C08G 77/12* (2013.01); *C08L 2312/06* (2013.01)

(58) Field of Classification Search
USPC .................................... 522/99, 1, 148; 520/1
See application file for complete search history.

(56) References Cited

U.S. PATENT DOCUMENTS

| 6,376,078 B1 | 4/2002 | Inokuchi | |
| 2015/0299399 A1* | 10/2015 | Rathore | C08G 77/20 |
| | | | 428/447 |

FOREIGN PATENT DOCUMENTS

| CN | 1827668 | 9/2006 |
| CN | 1887921 | 1/2007 |
| CN | 101376812 | 3/2009 |
| CN | 101550217 | 10/2009 |
| CN | 101717565 | 6/2010 |
| CN | 101724394 | 6/2010 |
| CN | 101781390 | 7/2010 |
| CN | 102432920 | 5/2012 |
| CN | 102532554 | 7/2012 |
| CN | 102585073 | 7/2012 |
| CN | 102718930 | 10/2012 |
| CN | 103012689 | 4/2013 |
| CN | 103030752 | 4/2013 |
| CN | 103113812 | 5/2013 |
| CN | 103173041 | 6/2013 |

(Continued)

OTHER PUBLICATIONS

"Norrish Reaction", Wikipedia, [Retrieved from the Internet on Jun. 12, 2014], URL <http://en.wikipedia.org/wiki/Norrish_reaction>, pp. 4.
Boardman, "($\eta^5$-Cyclopentadienyl) Trialkylplatinum Photohydrosilylation Catalysts. Mechanism of Active Catalyst Formation and Preparation of a Novel Bis (Silyl) Platinum Hydride," Organometallics, 1992, vol. 11, No. 12, pp. 4194-4201.
Burget, "Kinetic Study of the Photoactivated Hydrosilylation of Some β-Dicarbonyl Complexes of Trialkylplatinum (IV)", Journal of Photochemistry and Photobiology A: Chemistry, 1996, vol. 97, pp. 163-170.

(Continued)

*Primary Examiner* — Ling Choi
*Assistant Examiner* — Jessica E Whiteley
(74) *Attorney, Agent, or Firm* — Carolyn A. Fischer

(57) ABSTRACT

Curable silsesquioxane polymers are described comprising a core comprising a first silsesquioxane polymer and an outer layer comprising a second silsesquioxane polymer bonded to the core. The silsesquioxane polymer of the core, outer layer, or combination thereof comprises ethylenically unsaturated groups. The first silsesquioxane polymer of the core is bonded to the second silsesquioxane polymer of the outer layer via silicon atoms bonded to three oxygen atoms. In some embodiments, the outer layer has a higher concentration of ethylenically unsaturated groups than the core. In this embodiment, the core may be substantially free of ethylenically unsaturated groups. In other embodiments, the core has a higher concentration of ethylenically unsaturated groups than the core. In this embodiment, the outer layer may be substantially free of ethylenically unsaturated groups. The core and outer layer each comprise a three-dimensional branched network of a different silsesquioxane polymer. The silsesquioxane polymers of the core and outer layer may be homopolymers or copolymers. Also described are methods of preparing curable silsesquioxane polymer comprising a core and outer layer bonded to the core, articles comprising curable or cured compositions comprising the silsesquioxane core/outer layer polymers, and methods of curing.

22 Claims, 2 Drawing Sheets

(56) References Cited

FOREIGN PATENT DOCUMENTS

| | | |
|---|---|---|
| CN | 103275273 | 9/2013 |
| CN | 103289021 | 9/2013 |
| EP | 0254418 | 1/1988 |
| EP | 0315226 | 5/1989 |
| EP | 0373941 | 6/1990 |
| EP | 0398701 | 11/1990 |
| EP | 0420155 | 4/1991 |
| EP | 0420585 | 4/1991 |
| EP | 0459257 | 12/1991 |
| EP | 0556953 | 8/1993 |
| EP | 0958805 | 11/1999 |
| EP | 2155761 | 2/2010 |
| JP | S55-111148 | 8/1980 |
| JP | S62-124159 | 6/1987 |
| JP | S62-130807 | 6/1987 |
| JP | S62-255957 | 11/1987 |
| JP | S63-291962 | 11/1988 |
| JP | 2541566 | 1/1989 |
| JP | H01-096265 | 4/1989 |
| JP | S64-90201 | 4/1989 |
| JP | H01-195458 | 8/1989 |
| JP | H02-233537 | 9/1990 |
| JP | H03-002808 | 1/1991 |
| JP | H03-154007 | 7/1991 |
| JP | H04-050243 | 2/1992 |
| JP | H04-110351 | 4/1992 |
| JP | H04-173863 | 6/1992 |
| JP | H04-175370 | 6/1992 |
| JP | H04-178411 | 6/1992 |
| JP | H05-271362 | 10/1993 |
| JP | H08-134308 | 5/1996 |
| JP | H11-060931 | 3/1999 |
| JP | H11-116681 | 4/1999 |
| JP | 2000-063674 | 2/2000 |
| JP | 2000-157928 | 6/2000 |
| JP | 2000-169591 | 6/2000 |
| JP | 2001-106925 | 4/2001 |
| JP | 2002-121536 | 4/2002 |
| JP | 2002-327030 | 11/2002 |
| JP | 2003-055459 | 2/2003 |
| JP | 2003-226835 | 8/2003 |
| JP | 3817192 | 9/2003 |
| JP | 2004-292541 | 10/2004 |
| JP | 2005-014293 | 1/2005 |
| JP | 2006-160880 | 6/2006 |
| JP | 2006-335978 | 12/2006 |
| JP | 2007-090865 | 4/2007 |
| JP | 2007-146148 | 6/2007 |
| JP | 2007-146150 | 6/2007 |
| JP | 2008-056751 | 3/2008 |
| JP | 2008-115302 | 5/2008 |
| JP | 2008-127405 | 6/2008 |
| JP | 2008-144053 | 6/2008 |
| JP | 2008-201908 | 9/2008 |
| JP | 2008-303358 | 12/2008 |
| JP | 2009-009045 | 1/2009 |
| JP | 2009-024077 | 2/2009 |
| JP | 2009-029893 | 2/2009 |
| JP | 2009-051934 | 3/2009 |
| JP | 2009-091466 | 4/2009 |
| JP | 2009-155496 | 7/2009 |
| JP | 2009-191120 | 8/2009 |
| JP | 2009-253203 | 10/2009 |
| JP | 2009-280706 | 12/2009 |
| JP | 2010-005613 | 1/2010 |
| JP | 2010-095619 | 4/2010 |
| JP | 2010-116442 | 5/2010 |
| JP | 2010-128080 | 6/2010 |
| JP | 2010-144153 | 7/2010 |
| JP | 2010-175798 | 8/2010 |
| JP | 2010-229303 | 10/2010 |
| JP | 2010-260881 | 11/2010 |
| JP | 2010-265410 | 11/2010 |
| JP | 2010-275521 | 12/2010 |
| JP | 2011-063482 | 3/2011 |
| JP | 2011-081123 | 4/2011 |
| JP | 2011-099074 | 5/2011 |
| JP | 2011-115755 | 6/2011 |
| JP | 2011-132087 | 7/2011 |
| JP | 2012-036335 | 2/2012 |
| JP | 2012-036336 | 2/2012 |
| JP | 2012-144661 | 8/2012 |
| JP | 2013-010843 | 1/2013 |
| JP | 2013-022791 | 2/2013 |
| JP | 2013-076075 | 4/2013 |
| JP | 2013-249371 | 12/2013 |
| JP | 2013-251103 | 12/2013 |
| JP | 2014-005363 | 1/2014 |
| JP | 2014-007058 | 1/2014 |
| KR | 2006-017891 | 2/2006 |
| KR | 2009-067315 | 6/2009 |
| KR | 2010-075235 | 7/2010 |
| KR | 2011-038471 | 4/2011 |
| KR | 2012-021926 | 3/2012 |
| KR | 2013-026991 | 3/2013 |
| KR | 2013-067401 | 6/2013 |
| WO | WO 2005-100426 | 10/2005 |
| WO | WO 2007-103654 | 9/2007 |
| WO | WO 2008-124080 | 10/2008 |
| WO | WO 2008-147072 | 12/2008 |
| WO | WO 2009-002660 | 12/2008 |
| WO | WO 2009-005880 | 1/2009 |
| WO | WO 2009-008452 | 1/2009 |
| WO | WO 2009-085926 | 7/2009 |
| WO | WO 2009-128441 | 10/2009 |
| WO | WO 2010-055632 | 5/2010 |
| WO | WO 2013-015469 | 1/2013 |
| WO | WO 2013-087365 | 6/2013 |
| WO | WO 2013-087366 | 6/2013 |
| WO | WO 2013-087368 | 6/2013 |
| WO | WO 2014-024379 | 2/2014 |
| WO | WO 2014-099699 | 6/2014 |
| WO | WO 2015-088932 | 6/2015 |
| WO | WO 2015-195355 | 12/2015 |
| WO | WO 2015-195391 | 12/2015 |

OTHER PUBLICATIONS

Ciba, "Coating Effects Segment IRGACURE 651", 2001, 2pgs.
Dow, "Dow Corning (R) 2-7466 Resin", Material Data Sheet, 2013, 2pgs.
Jakuczek, "Well-defined core-shell structures based on silsesquioxane microgels: Grafting of polystyrene via ATRP and product characterization", Polymer, 2008, vol. 49, pp. 843-856.
Lewis, "Platinum(II) Bis(β-Diketones) as Photoactivated Hydrosilation Catalysts", Inorganic Chemistry, 1995, vol. 34, No. 12, pp. 3182-3189.
Su, "New Photocurable Acrylic/Silsesquioxane Hybrid Optical Materials: Synthesis, Properties, and Patterning", Macromolecular Materials and Engineering, 2007, vol. 292, pp. 666-673.
Wang, "Photoactivated Hydrosilylation Reaction of Alkynes," Journal of Organometallic Chemistry, 2003, vol. 665, pp. 1-6.
International Search Report for PCT International Application No. PCT/US2015/031727, mailed on Sep. 18, 2015. 4pgs.

* cited by examiner

CURABLE POLYMERS COMPRISING SILSESQUIOXANE POLYMER CORE AND SILSESQUIOXANE POLYMER OUTER LAYER AND METHODS

CROSS REFERENCE TO RELATED APPLICATIONS

This application is a national stage filing under 35 U.S.C. 371 of PCT/US2015/031727, filed May 20, 2015, which claims the benefit of U.S. Provisional Application No. 62/014,778, filed Jun. 20, 2014, the disclosure of which is incorporated by reference in its/their entirety herein.

SUMMARY

Curable silsesquioxane polymers are described comprising a core comprising a first silsesquioxane polymer and an outer layer comprising a second silsesquioxane polymer bonded to the core. The silsesquioxane polymer of the core, outer layer, or combination thereof comprises ethylenically unsaturated groups. The first silsesquioxane polymer of the core is bonded to the second silsesquioxane polymer of the outer layer via silicon atoms bonded to three oxygen atoms. In some embodiments, the outer layer has a higher concentration of ethylenically unsaturated groups than the core. In this embodiment, the core may be substantially free of ethylenically unsaturated groups. In other embodiments, the core has a higher concentration of ethylenically unsaturated groups than the core. In this embodiment, the outer layer may be substantially free of ethylenically unsaturated groups. The core and outer layer each comprise a three-dimensional branched network of a different silsesquioxane polymer. The silsesquioxane polymers of the core and outer layer may be homopolymers or copolymers.

Also described are methods of preparing curable silsesquioxane polymer comprising a core and outer layer bonded to the core, articles comprising curable or cured compositions comprising the silsesquioxane core/outer layer polymers, and methods of curing.

DETAILED DESCRIPTION OF EXEMPLARY EMBODIMENTS

Figure 1A:
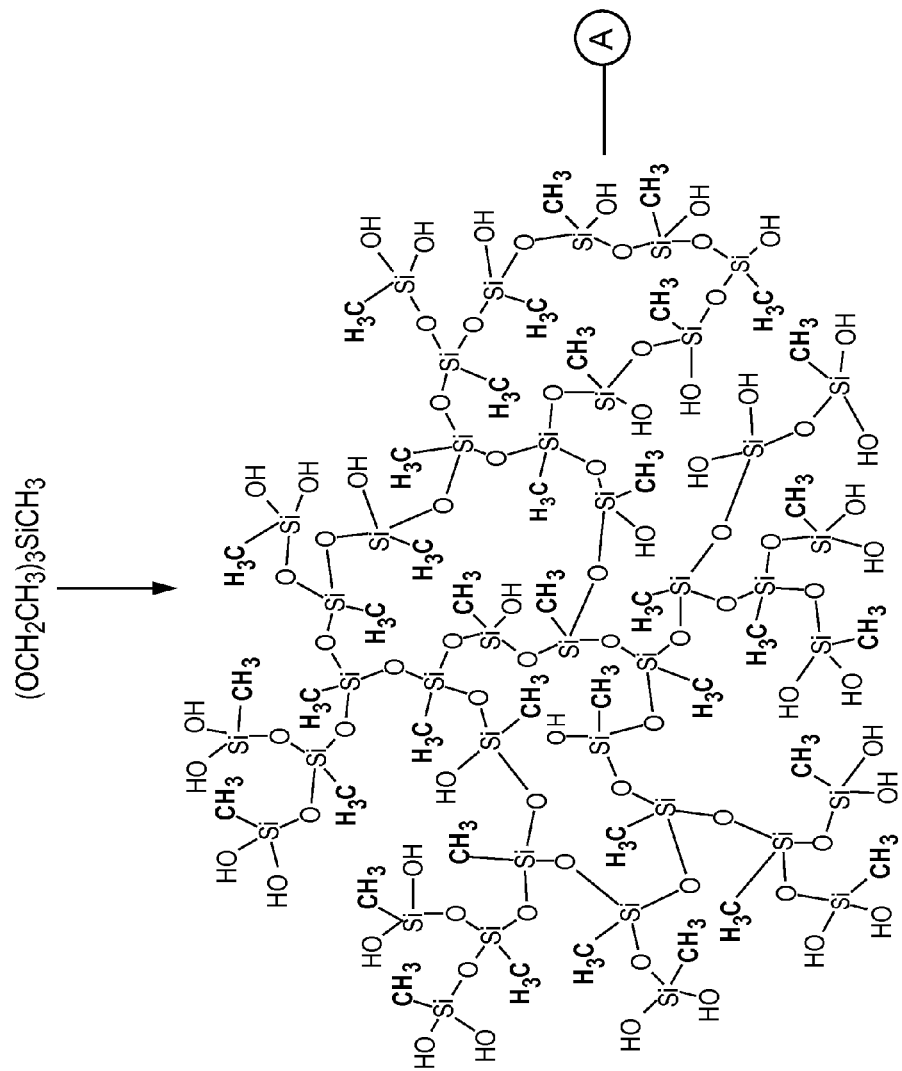
FIG. 1A is an illustrative schematic of a silsesquioxane polymer core.

As used herein, the term "organic group" means a hydrocarbon group (with optional elements other than carbon and hydrogen, such as oxygen, nitrogen, sulfur, silicon, and halogens) that is may be characterized as an aliphatic group, aromatic group, or combination thereof (e.g., alkaryl and aralkyl groups). In the context of the present invention, the organic groups are those that do not interfere with the formation of curable silsesquioxane polymer.

The term "aliphatic group" means a saturated or unsaturated linear, branched, or cyclic hydrocarbon group. This term is used to encompass alkyl, alkenyl, and alkynyl groups, for example. The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" are defined herein below. The term "heterocyclic group" means a closed ring hydrocarbon in which one or more of the atoms in the ring is an element other than carbon (e.g., nitrogen, oxygen, sulfur, etc.). The organic group can have any suitable valency but is often monovalent or divalent.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Any additional rings can be unsaturated, partially saturated, or saturated. Optionally, an aromatic ring can have one or more additional carbocyclic rings that are fused to the aromatic ring. Unless otherwise indicated, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is an alkylene group substituted with an aryl group or an alkylene group attached to an arylene group. The term "alkarylene"

refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions (e.g. condensation). Typical hydrolyzable groups include, but are not limited to, alkoxy, aryloxy, aralkoxy, alkaryloxy, acyloxy, or halogen (directly boned to s silicon atom). As used herein, the term is often used in reference to one of more groups bonded to a silicon atom in a silyl group.

The term "alkoxy" refers to a monovalent group having an oxy group bonded directly to an alkyl group.

The term "aryloxy" refers to a monovalent group having an oxy group bonded directly to an aryl group.

The terms "aralkyloxy" and "alkaryloxy" refer to a monovalent group having an oxy group bonded directly to an aralkyl group or an alkaryl group, respectively.

The term "acyloxy" refers to a monovalent group of the formula —O(CO)$R^b$ where $R^b$ is alkyl, aryl, aralkyl, or alkaryl. Suitable alkyl $R^b$ groups often have 1 to 10 carbon atoms, 1 to 6 carbon atoms, or 1 to 4 carbon atoms. Suitable aryl $R^b$ groups often have 6 to 12 carbon atoms such as, for example, phenyl. Suitable aralkyl and alkaryl $R^b$ groups often have an alkyl group with 1 to 10 carbon atoms, 1 to 6 carbon atoms, or 1 to 4 carbon atoms and an aryl having 6 to 12 carbon atoms.

The term "halo" refers to a halogen atom such as fluoro, bromo, iodo, or chloro. When part of a reactive silyl, the halo group is often chloro.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

When a group is present more than once in a formula described herein, each group is "independently" selected, whether specifically stated or not. For example, when more than one R group is present in a formula, each R group is independently selected. Furthermore, subgroups contained within these groups are also independently selected. For example, when each R group contains a Y group, each Y is also independently selected.

As used herein, the term "room temperature" refers to a temperature of 20° C. to 25° C. or 22° C. to 25° C.

A silsesquioxane is an organosilicon compound with the empirical chemical formula $R'SiO_{3/2}$ where Si is the element silicon, O is oxygen and R' is either hydrogen or an aliphatic or aromatic organic group that optionally further comprises an ethylenically unsaturated group. Thus, silsesquioxanes polymers comprise silicon atoms bonded to three oxygen atoms. Silsesquioxanes polymers that have a random branched structure are typically liquids at room temperature. Silsesquioxanes polymers that have a non-random structure like cubes, hexagonal prisms, octagonal prisms, decagonal prisms, and dodecagonal prisms are typically solids as room temperature.

Presently described are curable silsesquioxane polymers, comprising a plurality of ethylenically unsaturated groups. The ethylenically unsaturated groups of the silsesquioxane polymer are typically free-radically polymerizable groups such as vinyl ($H_2C=CH-$) including vinyl ethers ($H_2C=CHO-$) and alkenyl ($H_2C=CH(CH_2)_n-$ wherein n typically ranges from 1 to 30 or 1 to 20 or 1 to 10. The ethylenically unsaturated groups of the silsesquioxane polymer may also be (meth)acryl such as (meth)acrylamide ($H_2C=CHCONH-$ and $H_2C=CH(CH_3)CONH-$) and (meth)acrylate ($CH_2=CHCOO-$ and $CH_2=C(CH_3)COO-$). The term "(meth)acrylate" includes both methacrylate and acrylate.

The presently described curable silsesquioxane polymers comprise a core comprising a first silsesquioxane polymer and an outer layer comprising a second silsesquioxane polymer bonded to the core. Such curable silsesquioxane polymers are referred to herein as "SSQ core/outer layer polymers". The second silsesquioxane polymer of the outer layer is typically bonded to the first silsesquioxane polymer of the core via silicon atoms bonded to three oxygen atoms. The silsesquioxane polymer of the core, outer layer, or combination thereof, comprises ethylenically unsaturated groups. The first silsesquioxane polymer core is typically a different silsesquioxane polymer than the second silsesquioxane polymer outer layer. The first and second silsesquioxane polymer can be a homopolymer or copolymer. The curable silsesquioxane polymers may optionally further comprises additional layers bonded to the second silsesquioxane polymer outer layer, or in other words more than one outer layer.

Silsesquioxane polymers comprising a first silsesquioxane polymer core and a second silsesquioxane polymer outer layer can be made sequential hydrolysis and condensation of hydrolyzable silane reactants. At least one of the hydrolyzable silane reactants comprises an ethylenically unsaturated group, having the formula $Z-Y-Si(R^1)_3$. In typical embodiments, at least one of the hydrolyzable silane reactants of the core or outer layer lacks an ethylenically unsaturated group, having the formula $X-Y-Si(R^1)_3$.

Figure 1B:
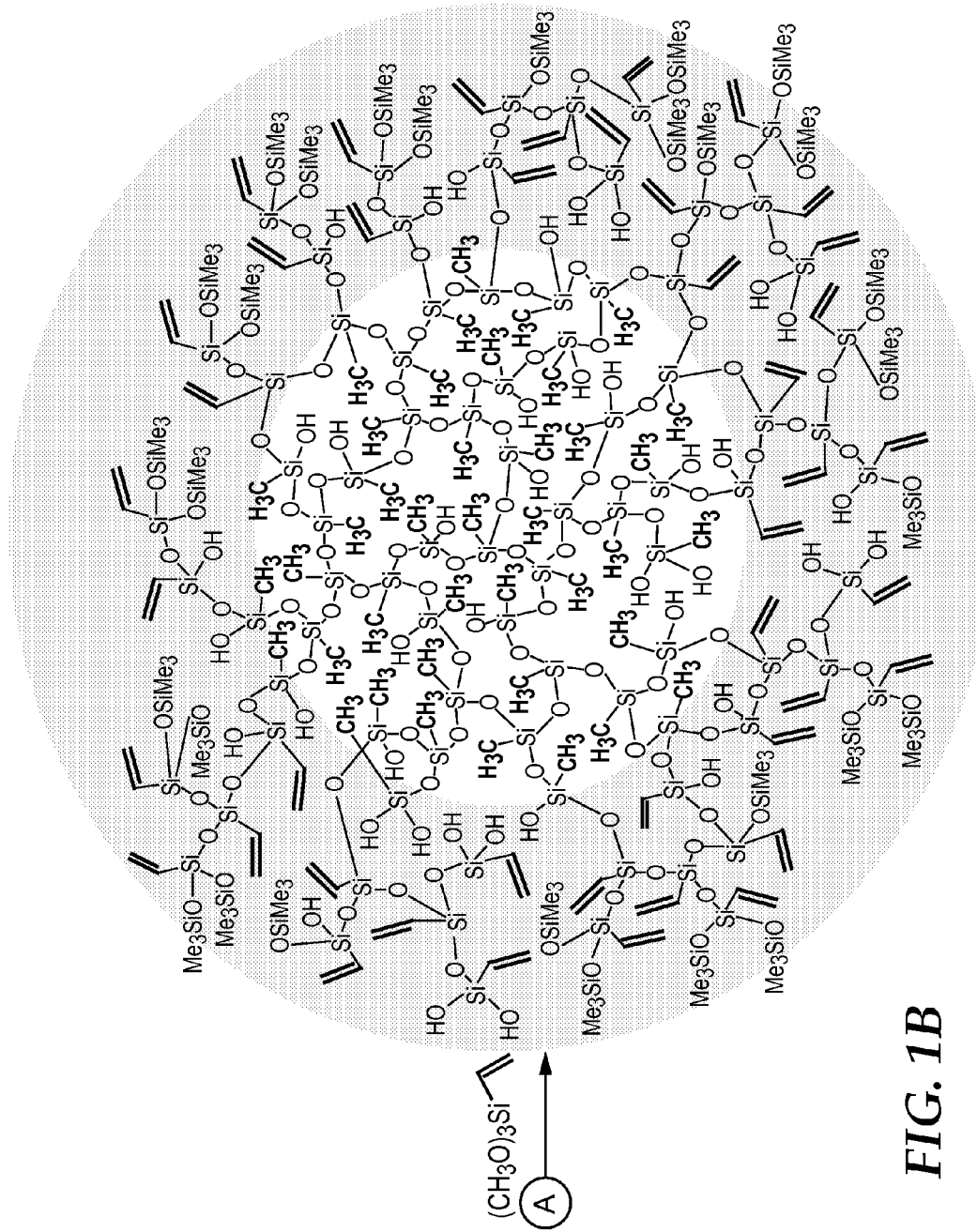
FIG. 1B is an illustrative schematic of a curable polymer comprising the silsesquioxane polymer core of FIG. 1A and a silsesquioxane polymer outer layer.

One embodied method of preparing a curable SSQ core/outer layer polymer comprises forming a first silsesquioxane polymer core by polymerizing one or more reactants comprising at least one reactant of the formula $X-Y-Si(R^1)_3$; and forming an outer layer of a second silsesquioxane polymer on the first silsesquioxane polymer core by polymerizing the first silsesquioxane polymer with one or more reactants comprising at least one reactant formula $Z-Y-Si(R^1)_3$. When the polymerization of the first silsesquioxane polymer core does not include any reactants comprising ethylenically unsaturated groups, this method produces a first silsesquioxane polymer core that is free of ethylenically unsaturated groups and an outer layer comprising ethylenically unsaturated groups. For example, in one illustrative embodiment, the core is the reaction product of methyltrimethoxyl silane and the outer layer is the reaction product of vinyltltriethoxysilane, as depicted in FIGS. 1A and 1B.

An alternative embodied method of preparing a curable SSQ core/outer layer polymer comprises forming a first silsesquioxane polymer core by polymerizing one or more reactants comprising at least one reactant of the formula $Z-Y-Si(R^1)_3$; and forming an outer layer of a second silsesquioxane polymer on the first silsesquioxane polymer core by polymerizing the first silsesquioxane polymer with one or more reactants comprising at least one reactant formula X—Y—Si(R$^1$)$_3$. When the polymerization of the second silsesquioxane polymer does not include any reactants comprising ethylenically unsaturated groups, this method produces a second silsesquioxane polymer outer layer that is free of ethylenically unsaturated groups and a core comprising ethylenically unsaturated groups.

When the molar weight ratio of reactants utilized to prepare the first and second silsesquioxane polymer is about 1:1, the resulting SSQ core/outer layer polymer has about the same mass of first silsesquioxane polymer as second silsesquioxane polymer. The second silsesquioxane polymer outer layer may substantially surrounds the first silsesquioxane polymer core, such as depicted in FIG. 1. The molar weight ratio may be altered such that the mass of second silsesquioxane polymer outer layer is less than the mass of first silsesquioxane polymer core. As the mass of outer layer is reduced relative to the mass of the core, the second silsesquioxane polymer outer layer may only partially cover the surface of the first silsesquioxane polymer core. In yet another embodiment, the molar weight ratio may be altered such that the mass of second silsesquioxane polymer outer layer is greater than the mass of first silsesquioxane polymer core. Although FIGS. 1A and 1B depict the core and SSQ core/outer layer polymer having a spherical shape, the shape can vary.

In some embodiments of the reactant X—Y—Si(R$^1$)$_3$, Y is a covalent bond or a divalent organic linking group; and X is hydrogen, a (monovalent) organic group such as alkyl, aryl, aralkyl, or alkaryl that may optionally comprise halogen or other substituents; or a reactive group that is not an ethylenically unsaturated group. X may optionally further comprise (e.g. contiguous) oxygen, nitrogen, sulfur, silicon, substituents. In some embodiments, X is an optionally halogenated (e.g. C$_1$-C$_{20}$) alkyl group such as (e.g. C$_4$-C$_6$) fluoroalkyl, a (e.g. C$_6$-C$_{12}$)aryl group such as phenyl, a (e.g. C$_6$-C$_{12}$)alk (e.g. C$_1$-C$_{20}$)aryl group, a (e.g. C$_6$-C$_{12}$)ar (e.g. C$_1$-C$_{20}$)alkyl group. In some embodiments, X comprises an epoxide ring.

Examples of X—Y—Si(R$^1$)$_3$ reactants include for example aromatic trialkoxysilanes such as phenyltrimethoxylsilane, (C$_1$-C$_{12}$) alkyl trialkoxysilanes such as methyltrimethoxylsilane, fluoroalkyl trialkoxysilanes such as nonafluorohexyltriethoxysilane, and trialkoxysilanes comprising a reactive group that is not an ethylenically unsaturated group such as glycidoxypropyltriethoxysilane; 3-glycidoxypropyltriethoxysilane 5,6-epoxyhexyltriethoxysilane; 2-(3,4-epoxycyclohexyl)ethyltriethoxysilane 3-(diphenylphosphino)propyltriethoxysilane; mercaptopropyltriethoxysilane; s-(octanoyl)mercaptopropyltriethoxysilane; 3-isocyanatopropyltriethoxysilane; hydroxy(polyethyleneoxy)propyl]triethoxysilane; hydroxymethyltriethoxysilane; 3-cyanopropyltriethoxysilane; 2-cyanoethyltriethoxysilane; and 2-(4-pyridylethyl)triethoxysilane.

Other commercially available X—Y—Si(R$^1$)$_3$ reactants include for example trimethylsiloxytriethoxysilane; p-tolyltriethoxysilane; tetrahydrofurfuryloxypropyltriethoxysilane; n-propyltriethoxysilane; (4-perfluorooctylphenyl)triethoxysilane; pentafluorophenyltriethoxysilane; nonafluorohexyltriethoxysilane; 1-naphthyltriethoxysilane; 3,4-methylenedioxyphenyltriethoxysilane; p-methoxyphenyltriethoxysilane; 3-isooctyltriethoxysilane; isobutyltriethoxysilane; (heptadecafluoro-1,1,2,2-tetrahydrodecyl)triethoxysilane; 3,5-dimethoxyphenyltriethoxysilane; (n,n-diethylaminomethyl)triethoxysilane; n-cyclohexylaminomethyl)triethoxysilane; 11-chloroundecyltriethoxysilane; 3-chloropropyltriethoxysilane; p-chlorophenyltriethoxysilane; chlorophenyltriethoxysilane; butylpoly(dimethylsiloxanyl)ethyltriethoxysilane; n,n-bis(2-hydroxyethyl)-3-aminopropyltriethoxysilane; benzyltriethoxysilane; and 2-[(acetoxy(polyethyleneoxy)propyl]triethoxysilane.

In some embodiments of the reactant Z—Y—Si(R$^1$)$_3$, Y is a covalent bond or a divalent organic linking group; and Z is an ethylenically group.

Examples of Z—Y—Si(R$^1$)$_3$ include vinyltriethoxysilane, allyltriethoxysilane, allylphenylpropyltriethoxysilane, 3-butenyltriethoxysilane, docosenyltriethoxysilane, hexenyltriethoxysilane, and methacryloxylpropyltrimethoxylsilane.

In some embodiments, Y is a (e.g. C$_1$-C$_{20}$) alkylene group, a (e.g. C$_6$-C$_{12}$) arylene group, a (e.g. C$_6$-C$_{12}$)alk (e.g. C$_1$-C$_{20}$)arylene group, a (e.g. C$_6$-C$_{12}$)ar (e.g. C$_1$-C$_{20}$) alkylene group, or a combination thereof. Y may optionally further comprise (e.g. contiguous) oxygen, nitrogen, sulfur, silicon, or halogen substituents, and combinations thereof. In some embodiments, Y does not comprise oxygen or nitrogen substituents that can be less thermally stable.

The reactant X—Y—Si(R$^1$)$_3$ and/or Z—Y—Si(R$^1$)$_3$ comprises three R$^1$ groups. In order to form a silsesquioxane polymer at least two of the R$^1$ groups are independently a hydrolyzable group. In typical embodiments, based on commercially available reactants, each R$^1$ group is independently a hydrolyzable group. In some embodiments of R$^1$, the hydrolyzable group is selected from alkoxy, aryloxy, aralkoxy, alkaryloxy, acyloxy, and halo. In some embodiments, R$^1$ is an alkoxy group. During hydrolysis, the hydrolyzable groups are converted to a hydrolyzed group, such as OH. The Si—OH groups react with each other to form silicone-oxygen linkages such that the majority of silicon atoms are bonded to three oxygen atoms.

Although sequential polymerizing (of the same reactants) could also be utilized to produce a random silsesquioxane copolymer that is substantially the same as a random silsesquioxane copolymer that can be produce by (concurrent) copolymerization of reactants, in typical embodiments the reactants are chosen such that the first silsesquioxane polymer of the core is different than the second silsesquioxane polymer of the outer layer. In some embodiments, the first and second silsesquioxane polymers differ in the number of polymerized units comprising pendent ethylenically unsaturated groups. In some, embodiments, the outer layer has a higher concentration of ethylenically unsaturated groups than the core. In other embodiments, the core has a higher concentration of ethylenically unsaturated groups than the outer layer. In yet other embodiments, the first and second silsesquioxane polymers may differ in the number and type of polymerized units lacking ethylenically unsaturated groups.

In some embodiments, the curable silsesquioxane polymer utilizes a single reactant X—Y—Si(R$^1$)$_3$ in the preparation of the first silsesquioxane polymer core and a single Z—Y—Si(R$^1$)$_3$ in the preparation of the second silsesquioxane polymer outer layer. Thus, the core may comprise a homopolymer lacking ethylenically unsaturated groups; whereas the outer layer may comprise a homopolymer comprising ethylenically unsaturated groups.

In some embodiments, the curable silsesquioxane polymer utilize a single reactant Z—Y—Si(R$^1$)$_3$ in the preparation of the first silsesquioxane polymer core and a single X—Y—Si(R$^1$)$_3$ in the preparation of the second silsesquioxane polymer outer layer. Thus, the core may comprise a homopolymer comprising ethylenically unsaturated groups;

whereas the outer layer may comprise a homopolymer lacking ethylenically unsaturated groups.

In yet other embodiments, the core, outer layer, or a combination thereof may each comprise a silsesquioxane copolymer. For example, the core may be a silsesquioxane homopolymer; whereas the outer layer may be a silsesquioxane copolymer. Alternatively, the core may be a silsesquioxane copolymer; whereas the outer layer may be a silsesquioxane homopolymer. Further, both, the core and outer layer may both be different silsesquioxane copolymers.

Copolymers can be prepared from at least two X—Y—Si($R^1$)$_3$ reactants. For example methyltriethoxysilane can be coreacted with phenyltrimethoxysilane. The silsesquioxane polymers may comprise at least two different X groups (e.g. X' and X"), yet the same Y groups. Alternatively, the silsesquioxane polymers may comprise at least two different Y groups (e.g. Y' and Y"), yet the same X group. Further, the silsesquioxane polymers may comprise at least two reactants wherein both Y and X are different from each other. In such embodiment, R2 of the silsesquioxane polymer formula is independently an organic group lacking an ethylenically unsaturated group. Further, m represents the total number of repeat units independently lacking ethylenically unsaturated group.

Copolymers can also be prepared from at least two Z—Y—Si($R^1$)$_3$ reactants. For example, vinyltriethoxysilane can be coreacted with allytriethoxysilane. In this embodiment, the silsesquioxane polymers may comprise at least two different Z groups (e.g. Z' and Z"), yet the same Y groups. Alternatively, the silsesquioxane polymers may comprise at least two different Y groups (e.g. Y' and Y"), yet the same Z group (e.g. vinyl). Further, the silsesquioxane polymers may comprise at least two reactants wherein both Y and Z are different from each other. In such embodiment, R of the curable silsesquioxane polymer formulas is independently an organic group comprising an ethylenically unsaturated group (e.g. such as a vinyl group). Further, n represents the total number of repeat units independently comprising an ethylenically unsaturated group.

Copolymers can also be prepared from at least one X—Y—Si($R^1$)$_3$ reactant and at least one Z—Y—Si($R^1$)$_3$. For example, vinyltriethoxylsilane or allytriethoxysilane can be coreacted with an alkenylalkoxylsilane such as 3-butenyltriethoxysilane and hexenyltriethoxysilane. Representative copolymers include for example vinyl-co-nonafluorohexyl silsequioxane, vinyl-co-glycidoxylpropyl silsesquioxane, vinyl-co-phenyl silsesquioxane, vinyl-co-methyl silsesquioxane, vinyl-coethyl silsesquioxane, and vinyl-co-hydro silsesquioxane; each of which have been preferably end-capped.

The inclusion of a silsesquioxane reactant or polymerized units having an R2 group that is not an ethylenically unsaturated group can be used to enhance certain properties depending on the selection of the R2 group. For example, when R2 comprises an aromatic group such as phenyl, the thermal stability can be improved (relative to a homopolymer of vinyltrimethoxysilane). When R2 comprises a reactive group, such as an epoxy, improved hardness can be obtained (relative to a homopolymer of vinyltrimethoxysilane). Further, when R2 comprises a fluoroalkyl group, the hydrophobicity can be improved.

In some embodiments, the silsesquioxane polymer of the core or outer layer can be characterized as a three-dimensional branched network having the formula:

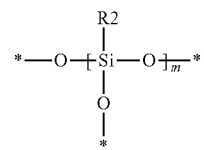

wherein R2 is an organic group that lacks an ethylenically unsaturated group and the oxygen atom at the * is bonded to another Si atom within the three-dimensional branched network. In some embodiments of the curable silsesquioxane polymer, R2 has the formula Y—X, as derived from the reactant X—Y—Si($R^1$)$_3$. Thus, Y is the depicted covalent bond or a divalent organic linking group as previously described. Further, X is the same a previously described. The number of polymerized units, m, is at least 2, 3, 4, 5, 6, 7, 8, 9, or 10. In some embodiments, m is at least 15, 20, 25, 30, 35, 40, 45, or 50. In some embodiments, m is no greater than 500, 450, 400, 350, 300, 250 or 200.

In other embodiments, the silsesquioxane polymer of the core or outer layer can be characterized as a three-dimensional branched network having the formula:

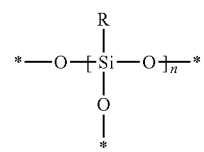

wherein R is an organic group comprising an ethylenically unsaturated group and the oxygen atom at the * is bonded to another Si atom within the three-dimensional branched network. In some embodiments of the curable silsesquioxane polymer, R has the formula Y—Z, as derived from the reactant Z—Y—Si($R^1$)$_3$. Thus, Y is the depicted covalent bond or a divalent organic linking group as previously described. Further, Z is the same a previously described. The number of polymerized units, n, is at least 2, 3, 4, 5, 6, 7, 8, 9, or 10. In some embodiments, n is at least 15, 20, 25, 30, 35, 40, 45, or 50. In some embodiments, n is no greater than 500, 450, 400, 350, 300, 250 or 200.

In yet other embodiments, the silsesquioxane polymer of the core or outer layer can be characterized as a three-dimensional branched network having the formula:

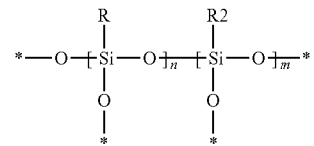

wherein R and R2 are organic groups as previously described, the oxygen atom at the * is bonded to another Si atom within the three-dimensional branched network, and n is at least 2 and m is at least 1.

After hydrolysis, remaining hydrolyzed (e.g. —OH) groups are preferably further reacted with end-capping agents to convert the hydrolyzed (e.g. —OH) groups to —OSi($R^3$)$_3$. Although not depicted in FIG. 1B, remaining hydrolyzed (e.g. —OH) groups of the first silsesquioxane polymer core can also be further reacted with end-capping agents to convert the hydrolyzed (e.g. —OH) groups to —OSi(R³)₃. The silsesquioxane polymer comprises terminal groups having the formula —Si(R³)₃ after end-capping.

Due to the end-capping, the curable SSQ core/outer polymer can comprise little or no —OH groups. In some embodiments, the OH groups are present in an amount of no greater than 5, 4, 3, 2, 1 or 0.5 wt-% of the curable SSQ core/outer polymer. In some embodiments, the curable SSQ core/outer polymer is free of —OH groups. Various alkoxy silane end-capping agents are known. In some embodiments, the end-capping agent has the general structure R⁵OSi(R³)₃ or O[Si(R³)₃]₂ wherein R⁵ is a hydrolyzable group, as previously described and R³ is independently a non-hydrolyzable group. Thus, in some embodiments R³ generally lacks an oxygen atom or a halogen directly bonded to a silicon atom. R³ is independently alkyl, aryl (e.g. phenyl), aralkyl, or alkaryl that optionally comprise halogen substituents (e.g. chloro, bromo, fluoro). The optionally substituted alkyl group may have a straight, branched, or cyclic structure. In some embodiments, R³ is a $C_1$-$C_{12}$ or $C_1$-$C_4$ alkyl optionally comprising halogen substituents. R³ may optionally comprise (e.g. contiguous) oxygen, nitrogen, sulfur, or silicon substituents. In some embodiments, R³ does not comprise oxygen or nitrogen substituents that can be less thermally stable.

A non-limiting list of illustrative end-capping agents and the resulting R³ groups is as follows:

| End-capping agent | R³ |
| --- | --- |
| n-butyldimethylmethoxysilane | n-butyldimethyl |
| t-butyldiphenylmethoxysilane | t-butyldiphenyl |
| 3-chloroisobutyldimethylmethoxysilane | 3-chloroisobutyldimethyl |
| phenyldimethylethoxysilane | phenyldimethyl |
| n-propyldimethylmethoxysilane | n-propyldimethyl |
| triethylethoxysilane | triethyl |
| trimethylmethoxysilane | trimethyl |
| triphenylethoxysilane | triphenyl |
| n-octyldimethylmethoxysilane | n-octyldimethyl |
| hexamethyldisiloxane | trimethyl |
| hexaethyldisiloxane | triethyl |
| 1,1,1,3,3,3-hexaphenyldisiloxane | triphenyl |
| 1,1,1,3,3,3-hexakis(4-(dimethylamino)phenyl)disiloxane | tri-[4-(dimethylamino)phenyl] |
| 1,1,1,3,3,3-hexakis(3-fluorobenzyl)disiloxane | tri-(3-fluorobenzyl) |

When the silsesquioxane polymer is further reacted with an end-capping agent to convert the hydrolyzed group, e.g. —OH, to —OSi(R³)³ the silsesquioxane polymers of the core or outer layer comprise a three-dimensional branched network having the formulas:

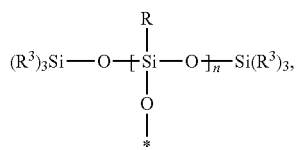

wherein n is at least 2;

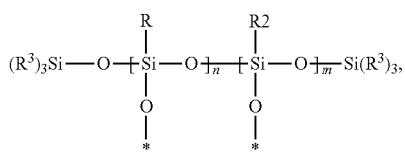

wherein n is at least 2 and m is at least 1;

wherein the oxygen atom at the * is bonded to another Si atom within the three-dimensional branched network, and R and R2 are the same as previously described.

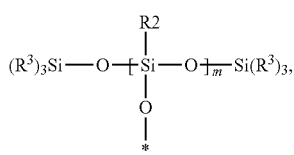

wherein m is at least 2;

In one naming convention, the R³ group derived from the end-capping agent is included in the name of the polymer. For example poly(vinylsilsesquioxane) end-capped with ethoxytrimethylsilane may be named "trimethyl silyl poly (vinylsilsesquioxane)" and has the general formula:

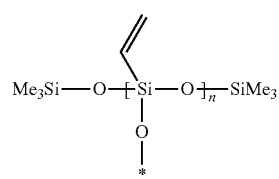

wherein the oxygen atom in the formula above at the * above is bonded to another Si atom within the three-dimensional branched network. Such three-dimensional branched network structure is depicted as follows:

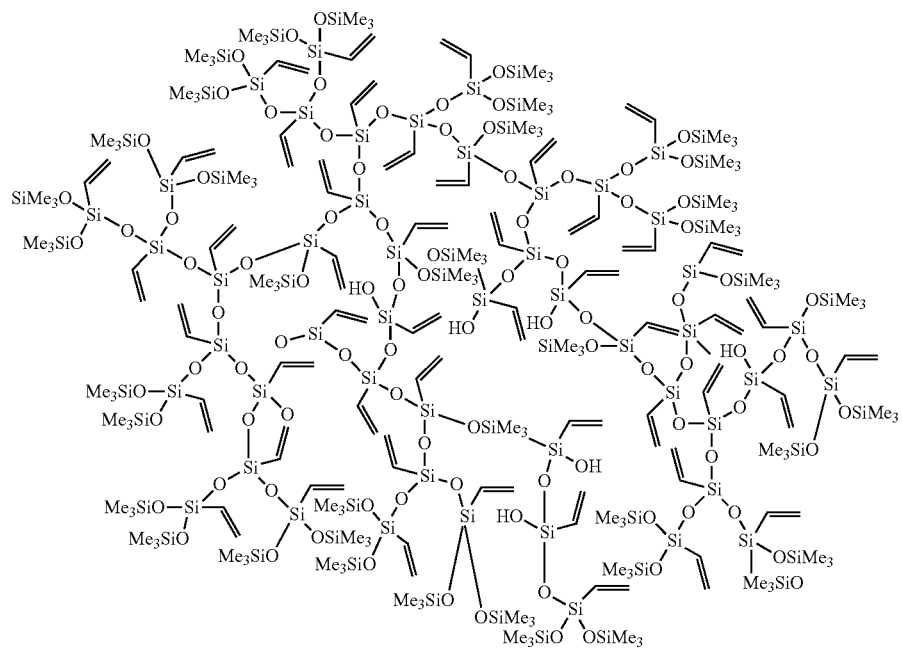

Various end-capped curable silsesquioxane polymers (i.e. homopolymers and copolymers) suitable for use as the core and/or outer layer are described in U.S. Provisional Patent Application Ser. Nos. 61/913,568, filed Dec. 9, 2013 and 62/014,735, filed Jun. 20, 2014; incorporated herein by reference.

The SSQ core/outer layer polymer (i.e. including both the core and outer layer) comprises at least two ethylenically unsaturated groups. Thus, n is at least 2, 3, 4, 5, 6, 7, 8, 9, or 10. In the case of copolymers comprising n and m units, m is at least 1, 2, 3, 4, 5, 6, 7, 8, 9, or 10. In some embodiments, n, m, or n+m is at least 15, 20, 25, 30, 35, 40, 45, or 50. In some embodiments, n or m is no greater than 500, 450, 400, 350, 300, 250 or 200. Thus, n+m can range up to 1000.

When the silsesquioxane polymer of the core or outer layer is prepared from one or more reactants, wherein all the reactants comprise an ethylenically unsaturated group, all (i.e. 100 mole %) of the repeat units comprise an ethylenically unsaturated group. In some embodiments, n and m of the core, outer layer, or SSQ core/outer layer polymer are selected such the polymer comprises at least 25, 30, 35, 40, 45, 50 mol % of repeat units comprising ethylenically unsaturated group(s) R. In some embodiments, n and m are selected such the core, outer layer, or SSQ core/outer layer polymer comprises at least 50, 55, 60, 65, 70, 75 mol % of repeat units comprising ethylenically unsaturated group(s) R. In some embodiments, n and m are selected such the core, outer layer, or SSQ core/outer layer polymer comprises no greater than 95, 90, 85, 80 mol % of repeat units comprising ethylenically unsaturated group(s) R.

SSQ core/outer layer polymers comprising at least two ethylenically unsaturated groups can be utilized to crosslink other components comprising ethylenically unsaturated groups. SSQ core/outer layer polymers having higher concentrations of ethylenically unsaturated groups at the outer layer can homopolymerize, or in other words self-polymerize. SSQ core/outer layer polymers having higher concentrations of ethylenically unsaturated groups at the core also be utilized to crosslink other components comprising ethylenically unsaturated groups and may self-polymerize when the core has a sufficiently large mass relative to the outer layer.

The SSQ core/outer layer polymers described herein can be cured by exposing the SSQ core/outer layer polymers to actinic radiation. In some favored embodiments, the curable SSQ core/outer layer polymers can be combined with a photoinitiator and UV cured. In some embodiments, the curing occurs for a time effective to render the coating sufficiently non-tacky to the touch. However, in other embodiments, the core cures and hardens, yet the outer layer can remain tacky.

Suitable photoinitiators include a variety of free-radical photoinitiators. Free-radical generating photoinitiators include Norrish Type I type reactions, which are commonly referred to as alpha cleavage type initiators. The Norrish Type I reactions can be characterized as the photochemical cleavage of aldehydes and ketones. Various aryl ketone and aryl aldehyde groups that are capable of Norrish Type I type cleavage are known, some of which are described in U.S. Pat. No. 5,506,279 (Gaddam et al.). Free-radical generating photoinitiators can also be Norrish Type II type reactions, which are commonly referred to as hydrogen abstraction type initiators. Various groups that are capable of Norrish Type II cleavage are also known, some of which are described in U.S. Pat. No. 5,773,485 (Gaddam et al.).

Exemplary free-radical photoinitiators include substituted acetophenones such as 2,2-dimethoxy-2-phenylacetophenone photoinitiator, available the trade name IRGACURE 651 or ESACURE KB-1 photoinitiator (Sartomer Co., West Chester, Pa.); benzophenone, 4-methylbenzophenone, benzoyl benzoate, phenylacetophenones, 2,2-dimethoxy-2-phenylacetophenone, alpha,alpha-diethoxyacetophenone, 1-hydroxy-cyclohexyl-phenyl-ketone (available under the trade designation IRGACURE 184 from BASF Corp., Florham Park, N.J.), 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one (available under the trade designation DAROCURE 1173 from BASF Corp.), 2,4,6-trimethylbenzoyl-diphenylphosphine oxide, and combinations thereof (e.g., a 50:50 by wt. mixture of 2,4,6-trimethylbenzoyl-diphenylphosphine oxide and 2-hydroxy-2-methyl-1-phenylpropan-1-one, available under the trade designation DAROCURE 4265 from BASF Corp.).

A photoinitiator is typically present in a coating composition in an amount of at least 0.01 percent by weight (wt-%), based on the total weight of curable material in the coating composition. A photoinitiator is typically present in a coating composition in an amount of no greater than 10 wt-%, based on the total weight of curable material in the coating composition.

Surprisingly, SSQ core/outer layer polymers comprising vinyl and alkenyl groups have been found to free-radically polymerize by means of photocuring.

The curable silsesquioxane polymers comprising ethylenically unsaturated groups, as described herein, can be utilized to crosslink other ethylenically unsaturated monomers, oligomers, and/or polymers. Surprisingly, the silsesquioxane polymers comprising vinyl and alkenyl groups have been found to free-radically polymerize by means of photocuring (e.g. at room temperature, 25° C.).

In some embodiments, the curable silsesquioxane polymers described herein can be utilized to crosslink vinyl or (meth)acrylate functional siloxanes, such as polydimethylsiloxane materials. In some embodiments, the polydimethylsiloxane is vinyl or (meth)acrylate terminated, having the general formula R-L-[Si(CH$_3$)$_2$O]$_n$Si(CH$_3$)$_2$-L-R, where n is the number of repeating monomer [SiO(CH$_3$)$_2$] units, L is a divalent (e.g. C$_1$-C$_4$ alkylene) linking group and R is vinyl or (meth)acrylate. Alternatively, the polydimethylsiloxane may comprise vinyl groups in the backbone such as in the case of a vinylmethyl siloxane homopolymer available from Gelest under the trade "VMS-T11". Various other vinyl or (meth)acrylate functional polydimethylsiloxanes are known that include other siloxane units in the backbone, other terminal groups, and/or have a different structure.

The molecular weight (Mw) of such vinyl or (meth)acrylate functional siloxanes typically ranges from about 200 to about 200,000 g/mole. In some embodiments, the molecular weight is no greater than about 100,000 or 50,000 g/mole. In some embodiments, the molecular weight is no greater than about 20,000; 15,000; 10,000 or 5,000 g/mole. The wt-% of vinyl or (meth)acrylate of the functional siloxanes is typically at least 0.02, 0.03, 0.04, or 0.05 wt-% ranging up to about 10, 15, 20, 25, or 30 wt-%. In some embodiments, the wt-% of vinyl or (meth)acrylate is less than 1 or 0.5 wt-%.

Curable SSQ core/outer layer polymers, as described herein, can be combined with a hydrosilylation catalyst and optionally a polyhydrosiloxane crosslinker and thermally cured by heating the curable coating.

Various hydrosilylation catalysts are knows. For examples, numerous patents describe the use of various complexes of cobalt, rhodium or platinum as catalysts for accelerating the thermally-activated addition reaction between a compound containing silicon-bonded to hydrogen and a compound containing aliphatic unsaturation. Various platinum catalyst are known such as described in U.S. Pat. No. 4,530,879; U.S. Pat. No. 4,510,094; U.S. Pat. No. 4,600,484; U.S. Pat. No. 5,145,886; and EP0398701; incorporated herein by reference. In one embodiment, the catalyst is a complex comprising platinum and an unsaturated silane or siloxane as described in U.S. Pat. No. 3,775,452; incorporated herein by reference. One exemplary catalyst of this type bis(1,3-divinyl-1,1,3,3-tetrametyldisiloxane) platinum.

Various hydrosiloxane crosslinkers are known. Hydrosiloxane crosslinkers have the following general formula.

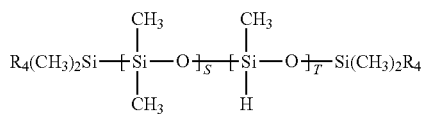

wherein T can be 0, 1, 2 and is typically less than 300;
S can be 0, 1, or 2 and is typically less than 500; and
R$_4$ is independently hydrogen or a C$_1$-C$_4$ alkyl and more typically H, methyl or ethyl; and with the proviso that when T is 0 at least one R$_4$ is hydrogen.

Such curable SSQ core/outer layer polymers can be combined with nanoparticles that can impart hardness to a coating. Suitable nanoparticles of the present disclosure include an inorganic oxide. Exemplary nanoparticle can include an oxide of a non-metal, an oxide of a metal, or combinations thereof. An oxide of a non-metal includes an oxide of, for example, silicon or germanium. An oxide of a metal includes an oxide of, for example, iron, titanium, cerium, aluminum, zirconium, vanadium, zinc, antimony, and tin. A combination of a metal and non-metal oxide includes an oxide of aluminum and silicon.

The nanoparticle can have an average particle size of no greater than 100 nanometers (nm), no greater than 75 nanometers, no greater than 50 nanometers, no greater than 25 nanometers, no greater than 20 nanometers, no greater than 15 nanometers, or no greater than 10 nanometers. The nanoparticle can have an average particle size of at least 1 nanometer, at least 5 nanometers, at least 15 nanometers, at least 20 nanometers, at least 25 nanometers, at least 50 nanometers, or at least 75 nanometers.

Various nanoparticles are commercially available. Commercial sources of nanoparticles are available from Nyacol Co., Ashland, Mass., Solvay-Rhodia (Lyon, France), and Nalco Co., Naperville, Ill. Nanoparticles can also be made using techniques known in the art. For example, zirconia nanoparticles can be prepared using hydrothermal technology, as described for example in PCT Publication No. WO2009/085926 (Kolb et al.). Suitable zirconia nanoparticles are also those described in, for example, U.S. Pat. No. 7,241,437 (Davidson, et al.).

In some embodiments, the nanoparticles may be in the form of a colloidal dispersion. Colloidal silica nanoparticles in a polar solvent are particularly desirable. Silica sols in a polar solvent such as isopropanol are available commercially under the trade names ORGANOSILICASOL IPA-ST-ZL, ORGANOSILICASOL IPA-ST-L, and ORGANOSILICASOL IPA-ST from Nissan Chemical Industries, Ltd., Chiyoda-Ku Tokyo, Japan.

Preferably, the nanoparticles are dispersed in a curable coating composition of the present disclosure. If used, nanoparticles are typically present in a curable coating composition in an amount of at least 5 wt-%, based on the total weight of the composition. If used, nanoparticles are typically present in a curable coating composition in an amount of no greater than 80 wt-%, or no greater than 50 wt-%, based on the total weight of the composition. Depending on the particle size of the nanoparticles and the amount of nanoparticles added, some compositions may be hazy. For example, a composition that includes over 50 wt-% of 10 nanometer nanoparticles may be hazy, but such composition can be useful for some applications.

A coating composition that includes a curable SSQ core/outer layer polymer, a photoinitiator, and optional nanoparticles, can also include an optional organic solvent, if desired. Useful solvents for the coating compositions include those in which the compound is soluble at the level desired. Typically, such organic solvent is an organic solvent. Exemplary useful polar solvents include, but are not limited to, ethanol, isopropanol, methyl ethyl ketone, methyl isobutyl ketone, dimethylformamide, and tetrahydrofuran, heptanes, hexanes, octanes, toluene. These solvents can be used alone or as mixtures thereof.

Any amount of the optional organic solvent can be used. For example, the curable coating compositions can include up to 50 wt-% or even more of organic solvent. The solvent can be added to provide the desired viscosity to the coating composition. In some embodiments, no solvent or only low levels (e.g., up to 10 wt-%) of organic solvent is used in the curable coating composition.

The coating composition is typically a homogeneous mixture (e.g., of just the curable SSQ core/outer layer polymer and photoinitiator) that has a viscosity appropriate to the application conditions and method. For example, a material to be brush or roller coated would likely be preferred to have a higher viscosity than a dip coating composition. Typically, a coating composition includes at least 5 wt-%, of the SSQ core/outer layer polymer, based on the total weight of the coating composition. A coating composition often includes no greater than 80 wt-%, of the SSQ core/outer layer polymer, based on the total weight of the coating composition.

A wide variety of coating methods can be used to apply a composition of the present disclosure, such as brushing, spraying, dipping, rolling, spreading, and the like. Other coating methods can also be used, particularly if no solvent is included in the coating composition. Such methods include knife coating, gravure coating, die coating, and extrusion coating, for example.

The curable coating composition described herein can be applied in a continuous or patterned layer. Such layer can be disposed on at least a portion of at least one surface of the substrate. If the curable composition includes an organic solvent, the coated curable composition can be exposed to conditions that allow the organic solvent to evaporate from the curable composition before UV curing the curable composition. Such conditions include, for example, exposing the composition to room temperature, or an elevated temperature (e.g., 60° C. to 70° C.).

The substrate on which the coating can be disposed can be any of a wide variety of hard or flexible materials. Useful substrates include ceramics, siliceous substrates including glass, metal, natural and man-made stone, and polymeric materials, including thermoplastics and thermosets. Suitable materials include, for example, poly(meth)acrylates, polycarbonates, polystyrenes, styrene copolymers such as styrene acrylonitrile copolymers, polyesters, polyethylene terephthalate.

The compositions described herein are suitable for preparing protective coatings such as weatherable silsesquioxane glass coating or hard coating for various end uses and articles. For example, such coatings can be used as anti-scratch and anti-abrasion coatings for various polycarbonate lens and polyesters films, which require additional properties such as optical clarity, durability, hydrophobicity, etc., or any other application where use of temperature, radiation, or moisture may cause degradation of films.

In some embodiments, the pencil hardness after curing is at least 3B, B, HB, H, 2H, or 3H. In some embodiments, the pencil hardness is no greater than 6H, 5H, or 4H.

Materials

Unless otherwise noted, all parts, percentages, ratios, etc., in the examples and in the remainder of the specification are by weight. Unless otherwise noted, all chemicals were obtained or are available from chemical suppliers such as Sigma-Aldrich Chemical Company, St. Louis, Mo.

| Designation | Description | Supplier |
| --- | --- | --- |
| | Ethoxytrimethylsilane | Gelest, Inc., |
| | Glycidoxypropyltriethoxysilane | Morrisville, PA |
| | Methacryloxypropyltrimethoxysilane | |
| | Methyltriethoxysilane | |
| | Methyltrimethoxysilane | |
| | Phenytrimethoxysilane | |
| | Trivinylmethoxysilane | |
| | Vinyldimethylmethoxysilane | |
| | Vinyltriethoxysilane | |
| "IRGACURE 184" | 1-Hydroxy-cyclohexyl-phenylketone | BASF Corp., Florham Park, NJ |
| IRG651 or KB-1 | 2,2-dimethoxy-1,2-diphenylethan-1-one photoinitiator | BASF Corporation, Florham Park, NJ or Lamberti USA, Inc., Conshohocken, PA. |
| IOA | Isooctyl acrylate | |
| IPA | 2-Propanol | Sigma-Aldrich |
| MEK | Methyl ethyl ketone | Chemical |
| Tartaric acid | 2,3-Dihydroxybutanedioic acid | Company, St. |
| Heptanes | Mixture of liner and branched heptanes | Louis, MO |
| "3SAB PET" | 2-mil (0.058 millimeter (mm)) thick polyester terephthalate (PET) film, which has one side chemically treated or primed to improve the adhesion of silicone coatings, commercially available under the trade designation "HOSTAPHAN 3SAB" | Mitsubishi Polyester Film, Greer, SC |

Method for Pencil Hardness

ASTM D3363-05(2011)e2 "Standard Test Method for Film Hardness by Pencil Test" (available from ASTM International, West Conshohocken, Pa.) was used to ascertain the hardness of the cured films prepared according to the examples and comparative examples described below. Apparatus used in this study was ELCOMETER 3086 Scratch Boy (obtained from Elcometer Instruments Limited, MI). Pencil hardness was measured by moving a pencil of a designated hardness grade (i.e., 9B, 8B, 7B, 6B, 5B, 4B, 3B, 2B, B, HB, F, H, 2H, 3H, 4H, 5H, 6H, 7H, 8H, 9H, from the softest grade to hardest grade pencil), and thereafter looking at the surface under a microscope to find if the surface was scratched. The sample was designated a hardness value corresponding to the hardest pencil that did not microscopically scratch the surface of the sample.

Example 1 (EX-1): Preparation of a SSQ Core/Outer Layer Polymer

Methyltriethoxysilane (100 g/0.56 moles), deionized water (70 g), and tartaric acid (0.25 g) were mixed together at room temperature in a 500 mL round bottom flask equipped with a condenser. The mixture was stirred at 70° C. for 1 hour, followed by the addition of vinyltriethoxysilane (10 g/0.052 moles) and subsequently stirring for 1 hour. Ethoxytrimethylsilane (20 g/0.17 moles) end-capping agent was then added, and the resulting mixture was stirred at 70° C. for 1 hour, followed by evaporation of the solvents (a water/ethanol mixture) under reduced pressure. The resulting viscous liquid was then dissolved in MEK (100 mL) and washed three-times with deionized water (100 mL). The MEK was then evaporated under reduced pressure to yield the SSQ core/outer layer polymer of EX-1 as a viscous liquid.

Examples 2 to 10 (EX-2 to EX-10)

Each of the SSQ core/outer layer polymers of EX-2 to EX-10 were prepared according the procedure Example 1, except using the materials and amounts listed in Table 1.

TABLE 1

| Example | Core-Reactant (amount in grams/moles) | Outer Layer-Reactant (amount in grams/moles) | Water, (amount in grams/moles) | Tartaric acid, (amount in grams/moles) |
|---|---|---|---|---|
| EX-2 | Methyltriethoxysilane (100/0.56) | Vinyltriethoxysilane (50/0.26) | 100/5.55 | 0.25/0.0016 |
| EX-3 | Methyltriethoxysilane (100/0.56) | Vinyltriethoxysilane (100/0.52) | 130/7.22 | 0.25/0.0016 |
| EX-4 | Phenyltrimethoxysilane (100/0.50) | Vinyltriethoxysilane (10/0.052) | 70/3.88 | 0.25/0.0016 |
| EX-5 | Phenyltrimethoxysilane (100/0.50) | Vinyltriethoxysilane (50/0.26) | 100/5.55 | 0.25/0.0016 |
| EX-6 | Phenyltrimethoxysilane (100/0.50) | Vinyltriethoxysilane (100/0.52) | 130/7.22 | 0.25/0.0016 |
| EX-7 | Glycidoxypropyl-triethoxysilane (50/0.18) | Vinyltriethoxysilane (5/0.026) | 30/1.66 | 0.25/0.0016 |
| EX-8 | Glycidoxypropyl-triethoxysilane (50/0.18) | Vinyltriethoxysilane (50/0.26) | 70/3.88 | 0.25/0.0016 |
| EX-9 | Methyltriethoxysilane (100/0.56) | Methacryloxypropyl-trimethoxysilane (50/0.20) | 70/3.88 | 0.25/0.0016 |
| EX-10 | Methyltriethoxysilane (100/0.56) | Methacryloxypropyltri-methoxysilane (50/0.20) | 130/7.22 | 0.25/0.0016 |

Preparation of Curable Formulations and Cured Film from the SSQ Core/Outer Layer Polymers of EX-1-10.

A curable formulation was prepared by dissolving the SSQ core/outer layer polymer of EX-1 (10 g) in 100 g of IPA/MEK mixture (70/30 by weight) followed by the addition of IRGACURE 184 (0.3 g). Using #8 Mayer Rod, the curable formulation was then coated on a 2-mil (0.058 millimeter (mm)) thick 3SAB PET film. The PET film coated with the curable formulation was then cured by being passed through a UV-chamber (obtained from Fusion UV Systems, Inc. Gaithersburg, Md., under trade designation "LIGHT HAMMER 6") equipped with a D-bulb located at 5.3 cm above sample, at web speed of 12 meters/minute. The coating was cured with a single pass through the UV-chamber (UV dose in one pass: 1.0 Joule/cm2), to provide a cured film.

Each of the SSQ polymers of EX 2-10 were formulated into a curable formulation, coated onto 3SAB PET film and cured in the same manner as EX-1.

The cured films of EX-1-10 were evaluated by hand and determined to be fully cured since the films were non-tacky to the touch. Some of the resulting films were evaluated for pencil hardness. The results are as follows:

| Cured Coating | Pencil Hardness |
|---|---|
| Cured Coating with SSQ core/outer layer polymer of EX-4 | 1H |
| Cured Coating with SSQ core/outer layer polymer of EX-7 | 1H |
| Cured Coating with SSQ core/outer layer polymer of EX-9 | 1H |
| Cured Coating with SSQ core/outer layer polymer of EX-10 | 1H |

Comparative Example A: Preparation of an SSQ Random Copolymer, Curable Formulation and Cured Film Methyltriethoxysilane (100 g), vinyltriethoxysilane (100 g), deionized water (130 g), and tartaric acid (0.25 g) were mixed together at room temperature in a 500 mL round bottom flask equipped with a condenser. The mixture was stirred at 70° C. for 2 hour followed by the addition of ethoxytrimethylsilane (20 g). The evaporation of the solvents (water/ethanol mixture) resulted in a viscous liquid that was dissolved in MEK (100 mL) and washed three times with deionized water (100 mL). After washing, the MEK was evaporated under reduced pressure to yield the SSQ random copolymer of CE-1 as a viscous liquid.

A curable formulation was prepared from the SSQ random copolymer of CE-1, and was coated onto 3SAB PET film and passed through the UV-chamber, in the same manner as described for the SSQ polymer of EX-1. However, a single pass through the UV-chamber afforded a coating that was tacky to touch, and a total of 4 passes through the UV-chamber were required before the coating became non-tacky.

Comparative Example B: Preparation of an SSQ Random Copolymer, Curable Formulation and Cured Film Phenyltrimethoxysilane (100 g), vinyltriethoxysilane (100 g), deionized water (130 g), and tartaric acid (0.25 g)

were mixed together at room temperature in a 500 mL round bottom flask equipped with a condenser. The mixture was stirred at 70° C. for 2 hour followed by the evaporation of the solvents (water/ethanol mixture). The resulting viscous liquid was dissolved in MEK (100 mL) and washed three-times with deionized water (100 mL). After washing, the MEK was evaporated under reduced pressure to yield the SSQ random copolymer of CE-2 as a viscous liquid.

A curable formulation was prepared from the SSQ random copolymer of CE-2, and was coated onto 3SAB PET film, and passed through the UV-chamber, in the same manner as described for the SSQ polymer of EX-1. However, the single pass through the UV-chamber afforded a coating that was tacky to touch, and a total of 8 passes through the UV-chamber were required before the coating became non-tacky.

Example 11 (EX-11): Preparation of a SSQ Core/Outer Layer Polymer

Vinyltriethoxysilane (100 g/0.52 moles), deionized water (70 g), and tartaric acid (0.25 g) were mixed together at room temperature in a 500 mL round bottom flask equipped with a condenser. The mixture was stirred at 70° C. for 1 hour, followed by the addition of methyltriethoxysilane (100 g/0.56 moles) and subsequently stirring for 1 hour. Ethoxytrimethylsilane (20 g) end-capping agent was then added, and the resulting mixture was stirred at 70° C. for 1 hour, followed by evaporation of the solvents (a water/ethanol mixture) under reduced pressure. The resulting viscous liquid was then dissolved in MEK (100 mL) and washed three-times with deionized water (100 mL). The MEK was then evaporated under reduced pressure to yield the SSQ polymer of EX-2 as a viscous liquid.

The Polymer of EX-11 was formulated into a curable formulation, coated onto 3SAB PET film, and passed through the UV-chamber, in the same manner as described for the SSQ polymer of EX-1. The coating was cured to a tacky coating after total of 7-passes through the UV-chamber. (UV dose in one pass: 1.0 Joule/$cm^2$).

Examples 12 and 13: SSQ Polymer of Examples 1 and 11 Utilized as Crosslinkers in an Adhesive Composition A glass jar was charged with 95 grams IOA, 5 gram AA and 0.04 grams of IRG651. The monomer mixture was stirred for 30 minutes at 21° C., purged with nitrogen for 5 minutes, and then exposed to low intensity ultraviolet UV A light (less than 10 mW/$cm^2$, referred to as UV A because the output is primarily between 320 and 390 nm with a peak emission at around 350 nm which is in the UV A spectral region) until a coatable, pre-adhesive polymeric syrup (Brookfield viscosity of 100-8000 cP) was formed. This forms a master batch, from which 10 g of the syrup was transferred to a smaller glass jar. In that smaller glass jar, the following were further added 0.016 g of IRG651, and 0.04 g of the SSQ core/outer layer polymer of EX-1. The jar was rotated over rubber rollers for 12 hours. The polymeric syrup was then coated between silicone release liners T-10 and T-50 at an approximate thickness of 3 mils (76.2 micrometers) and cured by means of UV-A light at a dosage of 750 mJ/$cm^2$. The release liner T-10 was then removed and the adhesive was laminated onto a 2 mils (51 micrometers) thick PET (Mitsubishi 3 SAB) liner, resulting in a tape.

Example 13 was the same as Example 12 except that SSQ core/outer layer polymer of EX-11 was used instead of the SSQ core/outer layer polymer of EX-1.

The tapes of Examples 12 and 13 were evaluated according to the following test methods Test Method 1: 180° Peel Adhesion A 180° Peel adhesion test was conducted to estimate the force necessary to peel an adhesive tape from a substrate, which is indicative of its peel strength. Peel adhesion strength was measured at a 180° angle using an IMASS SP-200 slip/peel tester (available from IMASS, Inc., Accord MA) at a peel rate of 305 mm/minute (12 inches/minute). Sample tapes were laminated and attached on a stainless steel ("SS") substrate panel. Test panels were prepared by wiping the substrate panels with a tissue wetted with 2-propanol, using heavy hand pressure to wipe the panel 8 to 10 times. This wiping procedure was repeated two more times with clean tissues wetted with solvent. The cleaned panel was allowed to air dry for 30 mins. The adhesive tape was cut into strips measuring 1.3 cm by 20 cm (½ in. by 8 in.), and the strips were rolled down onto the cleaned panel with a 2.0 kg (4.5 lb.) rubber roller using 2 passes. The prepared samples were stored at 23° C./50% relative humidity (RH) for different periods of aging times, typically 1 h, before testing. Peel strength values were the average result of 3-5 repeated experiments. The adhesive was cleanly removable from the stainless steel unless indicated otherwise.

Test Method 2: Shear Holding Power

Shear holding power (or static shear strength) was evaluated at 23° C./50% RH using a 1 kg load. Tape test samples measuring 0.5 inch (1.27 cm) by 6 inches (15.24 cm) were adhered to 1.5 inch (3.8 cm) by 2 inch (5.1 cm) stainless steel ("SS") panels using the method to clean the panel and attach the tape described in the peel adhesion test. The tape overlapped the panel by 1.27 cm by 2.54 cm (½ inch by 1 inch), and the strip was folded over itself on the adhesive side, and then folded again. A hook was hung in the second fold and secured by stapling the tape above the hook. The weight was attached to the hook and the panels were hung in a 23° C./50% RH room. The time to failure in minutes was recorded. If no failure was observed after 4,000 minutes, the test was stopped.

The results were as follows:

| Example | Adhesion to Stainless Steel, 180° Peel Adhesion, Test Method 1, oz/in (N/dm) | Shear Holding Power, Test Method 3, minutes |
| --- | --- | --- |
| EX-12 - SSQ Polymer Crosslinker of Example 1 | 42 (46) adhesive residue | 1480 cohesive failure |
| EX-13 - SSQ Polymer Crosslinker of Example 11 | 35 | 4000+ |

EX-14 Preparation of a SSQ Core/Outer Layer Polymer

Iso-octyltrimethoxysilane; (50 g), deionized water (80 g), and tartaric acid (0.25 g) were mixed together at room temperature in a 500 mL round bottom flask equipped with a condenser. The mixture was stirred at 70° C. for 1 hour followed by the addition of vinyltriethoxysilane (monomer 1) (100 g) and subsequent stirring for 1 hours followed by the addition of ethoxytrimethylsilane (40 g). The resulting mixture was stirred at 70° C. for 1 hour followed by the evaporation of the solvents (water/ethanol mixture). The resulting viscous liquid was dissolved in methyl ethyl ketone (100 mL) and washed three-times with deionized water (100 mL). After washing, the methyl ethyl ketone was evaporated under reduced pressure to yield a SSQ core-outer layer polymer as viscous liquid (SSQ-14).

Example 15

The SSQ material of Example 14 (SSQ-14, 5 g) and vinyl terminated polydimethylsiloxane available from Gelest, Inc., Morrisville, Pa. under the trade designation "DMS-V00" (5 g) were dissolved in 100 g of heptanes/methylethyl ketone mixture (50/50) followed by the addition of IRGA-CURE 184 (0.3 g) to form a coatable mixture. Using a #8 MAYER ROD, the coatable mixture was then coated onto a 2-mil (0.058 millimeter (mm)) thick 3SAB PET film. The coated film was passed at 12 meters/minute through a UV-chamber (obtained from Fusion UV Systems, Inc., Gaithersburg, Md., under trade designation "LIGHT HAMMER 6") equipped with an H-bulb located 5.3 cm above the sample. The coating was cured to touch.

Examples 16-17

Examples 16-17 were made and cured in the same manner as Example 15, utilizing the kinds and amounts of materials indicated in the following table. These coatings were also cured to touch.

| Ex. # | SSQ Material (Amount in grams) | Polymer Material (Amount in grams) |
|---|---|---|
| 16 | SSQ of Ex. 14 (2 g) | polydimethylsiloxane available from Gelest, Inc., under the trade designation "DMS-V03" (5 g) |
| 17 | SSQ of Ex. 14 (2 g) | Vinylmethylsiloxane available from Gelest, Inc., under the trade designation "VMS-T11" (5 g) |

What is claimed is:

1. A curable silsesquioxane polymer comprising a core comprising a first silsesquioxane polymer and an outer layer comprising a second silsesquioxane polymer bonded to the core wherein the first silsesquioxane polymer of the core is a different silsesquioxane polymer than the second silsesquioxane polymer of the outer layer and the silsesquioxane polymer of the core, outer layer, or a combination thereof comprises ethylenically unsaturated groups.

2. The curable silsesquioxane polymer of claim 1 the first silsesquioxane polymer of the core is bonded to the second silsesquioxane polymer of the outer layer via silicon atoms bonded to three oxygen atoms.

3. The curable silsesquioxane polymer of claim 1 wherein the outer layer has a higher concentration of ethylenically unsaturated groups than the core.

4. The curable silsesquioxane polymer of claim 1 wherein the core is free of ethylenically unsaturated groups.

5. The curable silsesquioxane polymer of claim 1 wherein the outer layer comprises a three-dimensional branched network having the formula $$*-O+\underset{\underset{*}{\underset{|}{O}}}{\overset{\overset{R}{|}}{Si}}-O+_n-* \quad \text{or,}$$

-continued $$*-O+\underset{\underset{*}{\underset{|}{O}}}{\overset{\overset{R}{|}}{Si}}-O+_n+\underset{\underset{*}{\underset{|}{O}}}{\overset{\overset{R2}{|}}{Si}}-O+_m-*$$

wherein

R is an organic group comprising an ethylenically unsaturated group,

R2 is an organic group lacking an ethylenically unsaturated group, the oxygen atom at the * is bonded to another Si atom within a three-dimensional branched network, and n is at least 2 and m is at least 1.

6. The curable silsesquioxane polymer of claim 1 wherein the core comprises a three-dimensional branched network having the formula $$*-O+\underset{\underset{*}{\underset{|}{O}}}{\overset{\overset{R2}{|}}{Si}}-O+_m-* \quad \text{or,} \quad *-O+\underset{\underset{*}{\underset{|}{O}}}{\overset{\overset{R}{|}}{Si}}-O+_n+\underset{\underset{*}{\underset{|}{O}}}{\overset{\overset{R2}{|}}{Si}}-O+_m-*$$

wherein

R2 is an organic group lacking an ethylenically unsaturated group, the oxygen atom at the * is bonded to another Si atom within the three-dimensional branched network, and m or n+m is at least 2.

7. The curable silsesquioxane polymer of claim 1 wherein the core has a higher concentration of ethylenically unsaturated groups than the outer layer.

8. The curable silsesquioxane polymer of claim 7 wherein the outer layer is free of ethylenically unsaturated groups.

9. The curable silsesquioxane polymer of claim 7 wherein the core comprises a three-dimensional branched network having the formula $$*-O+\underset{\underset{*}{\underset{|}{O}}}{\overset{\overset{R2}{|}}{Si}}-O+_m-* \quad \text{or,} \quad *-O+\underset{\underset{*}{\underset{|}{O}}}{\overset{\overset{R}{|}}{Si}}-O+_n+\underset{\underset{*}{\underset{|}{O}}}{\overset{\overset{R2}{|}}{Si}}-O+_m-*$$

wherein

R is an organic group comprising an ethylenically unsaturated group,

R2 is an organic group lacking an ethylenically unsaturated group, the oxygen atom at the * is bonded to another Si atom within a three-dimensional branched network, and n is at least 2 and m is at least 1.

10. The curable silsesquioxane polymer of claim 7 wherein the outer layer comprises a three-dimensional branched network having the formula

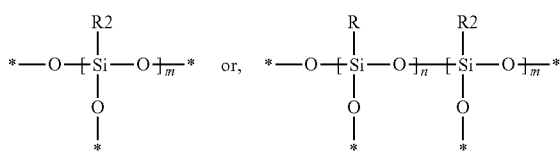

wherein
R2 is an organic group lacking an ethylenically unsaturated group,
the oxygen atom at the * is bonded to another Si atom within the three-dimensional branched network,
and m or n+m is at least 2.

11. The curable silsesquioxane polymer of claim 1 wherein the curable silsesquioxane polymer comprises terminal groups having the formula —Si(R$^3$)$_3$ wherein R$^3$ is independently selected from alkyl, aryl, aralkyl, or alkaryl; optionally further comprising substituents.

12. The curable silsesquioxane polymer of claim 1 wherein the curable silsesquioxane polymer further comprise —OH groups present in an amount of no greater than 5 wt-% of the silsesquioxane polymer.

13. The curable silsesquioxane polymer of claim 1 wherein the silsesquioxane polymer is free of —OH groups.

14. The curable silsesquioxane polymer of claim 1 wherein the ethylenically unsaturated group is a vinyl or alkenyl group.

15. The curable silsesquioxane polymer of claim 1 wherein the ethylenically unsaturated groups can be cross-linked via exposure to ultraviolet radiation.

16. A photocurable composition comprising a free-radical photoinitiator and the curable silsesquioxane polymer of claim 1.

17. The photocurable composition of claim 16 wherein the ethylenically unsaturated group is a vinyl or alkenyl group.

18. The photocurable composition of claim 16 further comprising at least one monomer, oligomer, or polymer comprising ethylenically unsaturated groups.

19. The photocurable composition of claim 18 wherein the ethylenically unsaturated groups of the at least one monomer, oligomer, or polymer are (meth)acrylate, vinyl, or a combination thereof.

20. The photocurable composition of claim 16 wherein the monomer, oligomer, or polymer is a siloxane containing monomer, oligomer or polymer.

21. An article comprising a substrate and the curable or cured composition of claim 16 disposed on at least a portion of at least one surface of the substrate.

22. The curable silsesquioxane polymer of claim 1 wherein the first and second silsesquioxane polymers differ in the number and type of polymerized units lacking ethylenically unsaturated groups.

* * * * *

UNITED STATES PATENT AND TRADEMARK OFFICE
CERTIFICATE OF CORRECTION

PATENT NO. : 9,725,561 B2
APPLICATION NO. : 15/307102
DATED : August 8, 2017
INVENTOR(S) : Jitendra Rathore It is certified that error appears in the above-identified patent and that said Letters Patent is hereby corrected as shown below:

In the Specification

Column 2
Line 8, delete "Hydrosilation" and insert -- Hydrosilylation --, therefor.

Column 4
Line 60, delete "vinytltriethoxysilane," and insert -- vinyltriethoxysilane, --, therefor.

Column 7
Line 29, delete "allytriethoxysilane." and insert -- allyltriethoxysilane. --, therefor.
Line 45, delete "allytriethoxysilane." and insert -- allyltriethoxysilane. --, therefor.
Line 49, delete "silsequioxane," and insert -- silsesquioxane, --, therefor.

Column 9
Line 5, delete "OH" and insert -- —OH --, therefor.

Column 14
Line 2, delete "tetrametyldisiloxane)" and insert -- tetramethyldisiloxane) --, therefor.

Column 16
Line 18, delete "Phenytrimethoxysilane" and insert -- Phenyltrimethoxysilane --, therefor.

Signed and Sealed this
Twentieth Day of February, 2018

Andrei Iancu
*Director of the United States Patent and Trademark Office*

CERTIFICATE OF CORRECTION (continued)
U.S. Pat. No. 9,725,561 B2

In the Claims

Column 22
Line 48-54,

In Claim 9, delete " 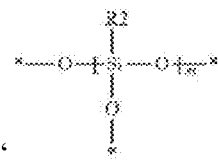 " and insert -- 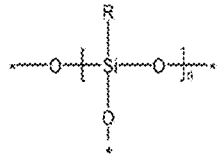 --, therefor.